United States Patent [19]
Aaron, III

[11] Patent Number: 6,158,781
[45] Date of Patent: Dec. 12, 2000

[54] PIPELINE SWIVEL COUPLING

[75] Inventor: John William Aaron, III, Houston, Tex.

[73] Assignee: Taper-Lok, Houston, Tex.

[21] Appl. No.: 09/080,657

[22] Filed: May 18, 1998

[51] Int. Cl.$^7$ .................................................. F16L 55/00
[52] U.S. Cl. .......................... 285/23; 285/261; 285/271; 285/288.1
[58] Field of Search ................................... 285/261, 271, 285/288.1, 23

[56] References Cited

U.S. PATENT DOCUMENTS

| | | | |
|---|---|---|---|
| 1,821,274 | 9/1931 | Plummer | 285/261 X |
| 2,456,744 | 12/1948 | Sjoberg | 285/261 X |
| 4,005,881 | 2/1977 | Burton et al. | 285/261 X |
| 4,139,221 | 2/1979 | Shotbolt | 285/261 X |
| 4,195,865 | 4/1980 | Martin . | |
| 4,381,871 | 5/1983 | Dopyera et al. . | |
| 4,443,030 | 4/1984 | Hairston et al. . | |
| 4,465,308 | 8/1984 | Martini . | |
| 4,486,037 | 12/1984 | Shotbolt . | |
| 4,489,962 | 12/1984 | Caumont et al. . | |
| 4,530,526 | 7/1985 | Dopyera et al. . | |
| 4,618,173 | 10/1986 | Dopyera et al. . | |
| 4,632,432 | 12/1986 | Reneau . | |
| 4,671,539 | 6/1987 | Reneau . | |
| 4,696,494 | 9/1987 | Schmitz et al. . | |
| 4,776,615 | 10/1988 | Young . | |
| 4,840,409 | 6/1989 | Welkey . | |
| 4,840,410 | 6/1989 | Welkey . | |
| 5,149,147 | 9/1992 | Kastrup et al. . | |
| 5,160,176 | 11/1992 | Gale . | |
| 5,290,075 | 3/1994 | Allread . | |
| 5,362,229 | 11/1994 | Yamaga . | |
| 5,368,342 | 11/1994 | Latham et al. . | |

*Primary Examiner*—Dave W. Arola
*Attorney, Agent, or Firm*—Gray, Cary, Ware & Freidenrich, LLP

[57] ABSTRACT

A swivel coupling for connecting misaligned pipe sections, the swivel coupling having a socket member with an integral flange, a ball member which mates with the socket member and a ball swivel flange which holds the ball member in contact with the socket member. The ball member has a spherical outer surface which is complementary to a spherical inner surface of the socket member and allows the ball member to swivel while remaining in mating contact with the socket member. The ball swivel flange has an inner spherical surface which includes an equatorial band wide enough to capture the spherical surface of the ball member within the ball swivel flange. A sealing ring is positioned between the ball member and socket member to ensure a proper seal. The flange of the socket member is bolted to the ball swivel flange to hold the swivel coupling assembly together and to draw the ball member and socket member into sealing contact.

4 Claims, 3 Drawing Sheets

PIPELINE SWIVEL COUPLING

BACKGROUND OF THE INVENTION

1. Field of the Invention

The invention relates to pipeline connectors and more particularly to means for sealingly connecting pipes which are axially misaligned.

2. Description of the Related Art

The use of pipelines for handling large volumes of fluids is widely known. High-volume pipelines are commonly used for fluid hydrocarbons such as oil. The pipelines used in these applications typically consist of a number of pipe sections which are connected end-to-end to form a single conduit. In many cases, adjoining pipe sections are axially aligned so that they can be connected by means of standard flanges at the respective ends of the pipes which are bolted together. In some cases, however, adjoining pipe sections may be misaligned so that a standard bolted-flange connection cannot form a seal or cannot be made at all. For example, in marine environments, it may not be possible to keep the pipe sections aligned when they are laid, and they may become misaligned due to environmental forces or repairs on the pipeline.

Various connectors have therefore been developed to allow pipe sections which are positioned at a slight angle with respect to each other to be sealingly connected. These connectors are sometimes referred to as misalignment flanges, ball connectors or swivel couplings. The structure of these swivel couplings generally comprises a ball member having a spherical, outwardly-facing surface, a socket or swivel member having a spherical, inwardly-facing surface and a set of flanges or other means for holding the ball and socket members together. A sealing ring or gasket is normally placed between the opposing spherical surfaces of the ball member and the socket member to ensure that a seal is formed between the members. The flanges are tightened to hold the members in sealing contact.

The ball member of a swivel coupling is joined to one pipe section (typically by welding) while the swivel member is joined to an adjoining pipe section. The spherical sealing surfaces of the ball and swivel members allow the connection, and the pipe sections, to swivel around the center of the members while maintaining the opposing positions of the surfaces. When the pipe sections are in their final positions, the flanges of the connector are tightened so that further movement of the connector members is prevented.

A variety of swivel coupling designs are disclosed in the prior art. For example, U.S. Pat. No. 4,840,410 to Welkey discloses a swivel coupling which has a socket member, a ball member and a flange. When the ball member is positioned in mating contact with the socket member, the flange is bolted to the socket member to hold the ball and socket together. Before the flange is bolted to the socket, however, the flange is loose and is may move quite a bit with respect to the ball member. The loose flange may make this swivel coupling difficult to handle and may even cause damage to the contact surfaces between the flange and ball member, causing the swivel coupling not to swivel as smoothly as if the surfaces were undamaged. The Welkey patent also discloses a swivel coupling in which both the ball member and socket member have integral flanges. The bolt holes through the flanges each have varying diameters so that the bolts inserted therethrough can swivel with the coupling. This design, however, requires machining of the multi-diameter bolt holes as well as spherical washers and seats.

U.S. Pat. No. 4,381,871 to Dopyera et al. shows another example of a swivel coupling in the prior art. This swivel coupling has a pair of flanges adjacent to a ball member as well as a conventional coupling flange. In this swivel coupling, the flanges adjacent to the ball member are bolted together so that the ball member is captive between them. These three parts form a swiveling assembly which is then bolted to the conventional coupling flange. While this swivel coupling does not have a loose retainer flange, it must be sealed both between the ball member and the flange at the leading edge of the ball member and between that flange and the conventional coupling flange. Because this coupling must be sealed at both places, it may be more likely to leak than a swivel coupling which has fewer components. The number of parts in this swivel coupling also makes it more complex and expensive to manufacture than a design having fewer parts.

SUMMARY OF THE INVENTION

The problems outlined above are in large part solved by the disclosed swivel coupling and method for manufacturing same. The present invention provides a swivel coupling for connecting misaligned pipe sections, the swivel coupling having a socket member with an integral flange, a ball member which mates with the socket member and a ball swivel flange which is permanently, though movably, connected to the ball member. The ball member has a convex surface for mating with a complementary concave surface of the socket member. Each of the mating surfaces is a spherical section and each has generally the same radius of curvature so that the ball member is allowed to swivel within the socket member while at the same time maintaining the mating relation of the surfaces. ("Mating relation" as used in describing the invention herein contemplates not only the condition in which complementary mating surfaces are in contact, but also the condition in which the surfaces are in close proximity but separated by a small gap.)

The ball member is held in close proximity to the socket member by the swivel flange. The swivel flange is generally annular in shape and has a concave inner surface which is complementary to the convex surface of the ball member. The swivel flange has generally the same radius of curvature as the ball member. The inner surface of the swivel flange is a spherical section which contains an equatorial band of the sphere. ("Equator" as used herein means a line defined by the intersection of a sphere and a plane bisecting the sphere. An "equatorial band," as used herein, generally refers to a spherical section containing an equator and a portion of the sphere on each side of the equator.) In other words, the surface includes a spherical section which covers an equator of the ball member's spherical surface. Because the spherical band includes a spherical portion on each side of the equator, when the equator of the ball member is within the aperture of the swivel flange, the ball member is trapped within the flange. Thus, although the ball member and swivel flange can swivel with respect to each other, one cannot be removed from the other.

The swivel flange is connected to the flange of the socket member, typically by bolting the two flanges together. When the flanges are loosely bolted together, the ball member is free to swivel within the spherical cavity formed by the concave surfaces of the swivel flange and socket member. When the bolts are tightened, the flanges are drawn together so that the concave surfaces of the swivel flange and socket member engage the convex surface of the ball member. The engagement of the surfaces serves to hold the ball member, socket member and swivel flange in their respective positions (i.e., to prevent further swiveling) and to form a seal between the ball member and socket member. One embodiment uses a sealing ring between the ball member and socket member to ensure a proper seal when the connection is made.

The invention further includes a method for manufacture of the swivel coupling. The ball member and socket member may be manufactured using any suitable means known in the art. In one embodiment, the components are machined from forged billets of carbon steel. In this embodiment, the ball swivel flange is manufactured as two components: a swivel flange body; and a retainer ring. Each component has an inner surface which forms a portion of the ball swivel flange's equatorial band. The portions of the equatorial band are roughly divided along the equator of the sphere. (Each portion may therefore be more particularly described as a section of a hemisphere) The two components are assembled on the spherical surface of the ball member so that the ball member is captured by the inner surfaces of the components. In one embodiment, the swivel flange body has a recessed portion in its inner surface within which the retainer ring fits. After the swivel flange body is placed on the ball member, the retainer ring is placed in the recess and welded into place so that it becomes integral (i.e., a single piece) with the swivel flange body.

BRIEF DESCRIPTION OF THE DRAWINGS

Other objects and advantages of the invention will become apparent upon reading the following detailed description and upon reference to the accompanying drawings in which.

Figure 2:
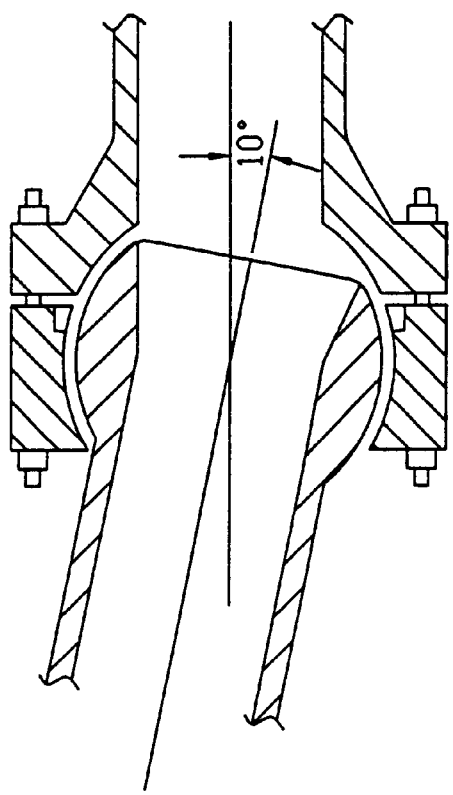
FIG. 2 is an axial section of one embodiment of the assembled and installed swivel coupling in a misaligned position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

In one embodiment of the invention, a swivel coupling comprises a socket member, a ball member and a swivel flange. The ball member has is adapted to be welded to a first pipe section, while the socket member is adapted to be welded to a second pipe section. The ball member has a spherical, concave outer surface and the socket member has a corresponding spherical, convex inner surface within which the ball member fits. When the ball member and socket member are mated, substantially all of the spherical surface of the socket member is in mating contact with the spherical surface of the ball member. Because the mating surfaces of the ball and socket members are spherical, the ball member is able to swivel with respect to the socket member while maintaining mating contact.

The swivel flange is a generally annular flange which has an inner surface complementary to the outer surface of the ball member. The inner surface is a spherical section having a radius of curvature roughly equal to that of the ball member's outer surface. This spherical surface includes an equatorial band. The swivel flange is disposed around the ball member. Because the swivel flange's inner surface includes an equatorial band, the openings in the faces of the swivel flange are smaller than the maximum diameter of the ball member's spherical surface. Thus, when the equator of the ball member's surface is between the faces of the swivel flange, the ball member is captive within the flange.

The swivel flange is bolted to the socket member in order to hold the ball member in mating contact with the socket member. When the bolts are loosened, the ball member is free to swivel within the spherical cavity formed by the inner surfaces of the swivel flange and socket member. When the bolts are tightened, however, the ball member is held in place between the swivel flange and socket member and the ball member and socket member are tightly engaged to provide a seal between them. One embodiment employs a sealing ring to ensure the integrity of the seal between the ball member and socket member.

Figure 1:
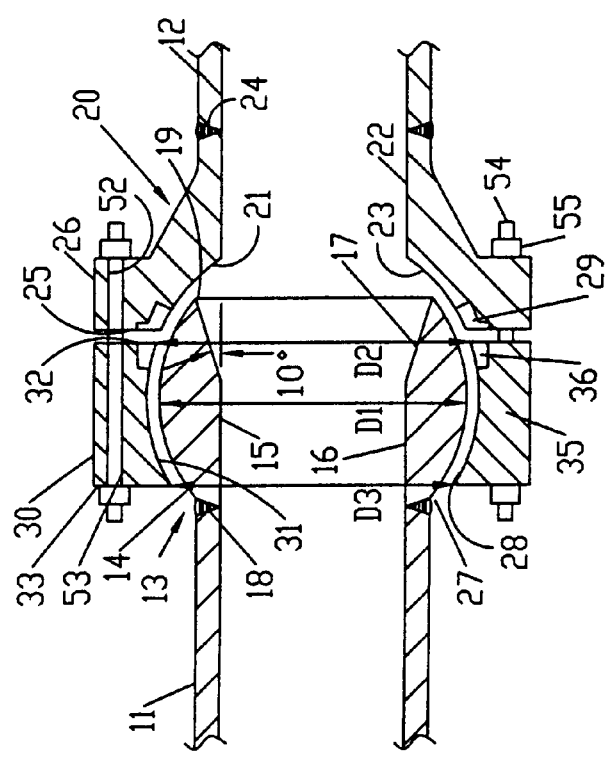
FIG. 1 is an axial section of one embodiment of the assembled and installed swivel coupling in aligned position.

Referring to FIG. 1, an axial section of one embodiment is shown. The swivel coupling 10 provides a means to connect a first pipe section 11 and a second pipe section 12. Pipe section 11 is attached to a trailing edge 18 of ball member 13 by welding. Ball member 13 has an outer surface 14 and an inner surface 15. Outer surface 14 is a convex spherical section having a radius R1 (and corresponding maximum diameter D1.) Inner surface 15 forms an aperture through ball member 13 coaxial with pipe section 11. Inner surface 15 comprises a cylindrical portion 16, which extends from trailing edge 18 approximately halfway through ball member 13, and a conic portion 17, which extends from leading edge 19 halfway through ball member 13 to meet cylindrical portion 16. Cylindrical portion 16 has a diameter equal to the inner diameter of pipe section 11. At the junction with cylindrical portion 16, conic portion 17 has a diameter equal to the inner diameter of pipe section 11. Conic portion 17 tapers outward toward leading edge 18 at an angle of approximately ten degrees. ("Taper" as used herein means an angle with respect to an axis and generally refers to a surface which forms a conic section. Such surfaces are also sometimes referred to in the art as frusto-conical surfaces.)

Socket member 20 is coaxial with pipe section 12 and has a trailing edge 24 which is welded to pipe section 12. Socket member 20 has an inner surface 21 which comprises cylindrical portion 22 and spherical portion 23. Cylindrical portion 22 has a diameter equal to the inner diameter of pipe section 12 and forms a substantially continuous surface with the inner surface of pipe section 12. Cylindrical portion 22 extends from trailing edge 24 to a junction with spherical portion 23. Spherical portion 23 extends from the junction toward leading edge 25. Spherical portion 23 is complementary to ball member outer surface 14 and accordingly has substantially the same radius of curvature. The radius of curvature of spherical portion 23 may be slightly larger than that of outer surface 14 to allow spherical portion 23 to fit over sealing ring 29 so that the sealing ring is properly compressed between the surfaces. Near leading edge 25, a tapered groove is recessed into spherical portion 23 for receiving sealing ring 29. At leading edge 25, socket member 20 has a radially outwardly extending flange 26. Flange 26 has bolt holes 52 extending therethrough parallel to the axis of socket member 20.

Swivel flange 30 is generally annular and has a leading edge 32 and a trailing edge 33. Swivel flange 30 has an aperture therethrough with a generally spherical inner surface 31 extending from leading edge 32 to trailing edge 33. Inner surface 31 forms an equatorial band between leading edge 32 and trailing edge 33. The aperture through swivel flange 30 therefore has a diameter D2 at leading edge 32 and a diameter D3 at trailing edge 33. Diameter D3 is generally smaller than diameter D2 because the portion of swivel flange 30 adjacent to trailing edge 33 has to be sufficiently strong to hold ball member 13 and socket member 20 in sealing contact, while the portion of swivel flange 30 adjacent to leading edge 32 only has to hold swivel flange 30 on ball member 13. The radius of curvature of inner surface 31 is slightly larger than that of ball member outer surface 14. Swivel flange 30 is positioned around ball member 13 so that the ball member is "captured" or "captive" within swivel flange 30. ("Captured" and "captive" herein are used to refer to the fact that ball member 14 is constrained to remain within the aperture of swivel flange 30 because the maximum diameter D1 of ball member 14 is larger than the diameters D2 and D3 of the aperture of swivel flange 30 at leading and trailing edges 32 and 33 and because ball member 14 is located between the leading and trailing edges.) Swivel flange 30 may also be said to be captured by ball member 13. Swivel flange 30 has bolt holes 53 extending therethrough parallel to the axis of the flange (perpendicular to leading and trailing edges 32 and 33.) Bolt holes 53 in swivel flange 30 form a pattern which matches the pattern of bolt holes 52 in flange 26 of socket member 20.

In the assembled swivel coupling 10, ball member 13 is positioned against socket member 20 so that outer surface 14 is adjacent to inner surface 23. Outer surface 14 contacts sealing ring 29, which is seated at the leading edge 25 of socket member 20. Bolt holes 52 of socket member 20 are aligned with bolt holes 53 of swivel flange 30 and bolts 54 are inserted through the aligned bolt holes. Nuts 55 are threaded onto bolts 54 and tightened to draw ball member 13 toward socket member 20 and hold outer surface 14 in sealing contact with sealing ring 29.

When bolts 54 are loosened, ball member 13 is free to swivel within the spherical cavity formed by socket member 20 and swivel flange 30. FIG. 1 shows the swivel coupling in an aligned position, where the axes of pipe section 11 and pipe section 12 are coincident. FIG. 2 shows the swivel coupling in a position having the maximum possible misalignment of pipe section 11 and pipe section 12. In one embodiment, the maximum misalignment is 10 degrees. Ball member 14 includes a ball stop 27 which, when the swivel coupling is at its maximum misalignment, contacts a corresponding flange stop 28 on swivel flange 30 and prevents further misalignment. It can be seen from FIG. 2 that one edge of conical portion 17 is in alignment with the inner surface of pipe section 12 when the pipe sections are at the maximum misalignment. When pipe sections 11 and 12 are in their final positions, bolts 54 are tightened. The pressure of the swivel flange's inner surface 31 against the outer surface 14 of ball member 13 prevents relative movement of the surfaces and holds the ball member and socket member 20 in their aligned or misaligned positions. Although bolts are used in the exemplary embodiment described above, various alternate means for connecting pipeline couplings such as ring clamps are known in the art and could be used in the invention in place of bolts.

The embodiment described above advantageously holds ball member 13 captive within swivel flange 30. Swivel Flange 30 is therefore prevented from falling away from ball member 13. When ball member 13 is attached to pipe section 11, swivel flange 30 remains out of the way of the connection and does not interfere with the process of making the connection. Further, swivel flange 30 swivels about ball member 13 while maintaining contact between swivel flange inner surface 31 and ball member outer surface 14. Since swivel flange is captured by ball member 13, there is no risk of impact damage to the respective spherical surfaces (and the resulting loss of seal integrity) which might be caused by a loose flange.

Figure 3:
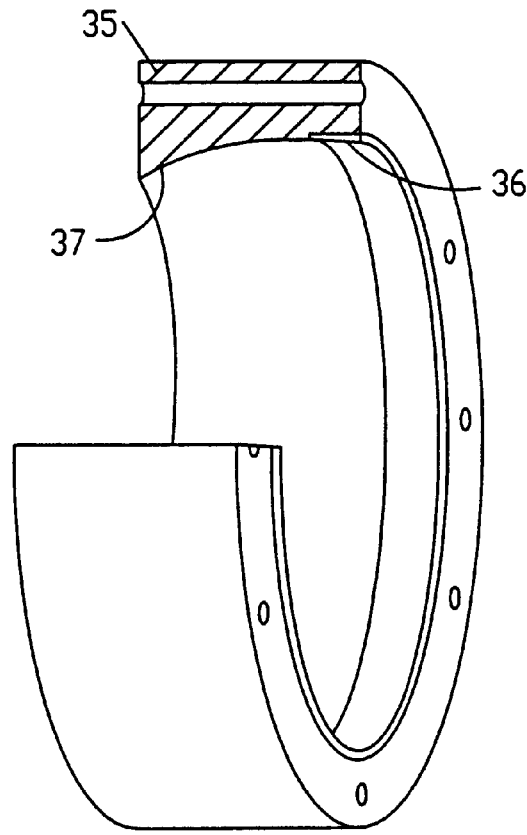
FIG. 3 is a cut away perspective view of the swivel flange of one embodiment of the swivel coupling.
Figure 4:
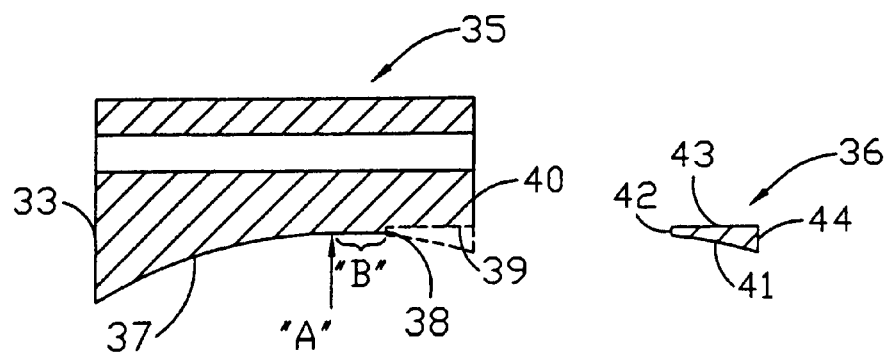
FIG. 4 is a partial axial section of the swivel flange body and retainer ring of one embodiment of the swivel coupling prior to assembly.

Referring to FIGS. 3 and 4, swivel flange 30 is assembled on ball fitting 13 by manufacturing the swivel flange in two pieces: a swivel flange body 35 and a retainer ring 36. Swivel flange body 35 is a thick, generally annular ring having a spherical inner surface 37, a shoulder 38 and a cylindrical inner surface 39. Shoulder 38 and a cylindrical inner surface 39 form a recess in the flange body 35. Cylindrical inner surface 39 has a radius of curvature greater than that of spherical inner surface 37. Retainer ring 36 has a spherical inner surface 41 which has a radius of curvature roughly equal to that of surface 37. Retainer ring 36 has a cylindrical outer surface 43 which has a radius of curvature approximately equal to that of surface 39. Retainer ring 36 is inserted into the recess in the flange body so that trailing edge 42 abuts shoulder 38 and retainer ring cylindrical surface 43 abuts flange body cylindrical surface 39. With the retainer ring so inserted, surfaces 37 and 41 form inner spherical surface 31. Likewise, leading edges 40 and 44 form the leading edge 32 of the swivel flange 30. Retainer ring 36 is secured into its position in the recess by welding. Retainer ring 36 may be welded along the entire length of the junction between it and flange body 35, or it may be stitch welded at a number of points along the junction. After retainer ring 36 is welded to swivel flange body 35, the two parts are integral to the swivel flange and cannot be separated. The resulting flange is a unitary (i.e., single-piece) flange.

Because retainer ring 36 is much smaller than prior art flanges, it is generally easier to manufacture and handle. Further, the use of retainer ring 36 integrally within swivel flange 30 forms a unitary flange which may be stronger than a set of separate flanges which are bolted together. As a result, swivel flange 30 may be designed to be smaller and lighter than comparable prior art flanges, with corresponding savings in time, materials and labor.

It should be noted that, although inner surface 31 of swivel flange 30 is described herein as forming an equatorial band, the surface need not be continuous along the band. In fact, because surface 31 is formed by inner surfaces 37 and 41 of flange body 35 and retainer ring 36, it is expected to be discontinuous at the junction of the surfaces. Further, because it requires less material, time and expense, a thinner retainer ring may be preferred over a thicker ring. In one embodiment, flange body 35 is manufactured with an inner surface 37 which is spherical from trailing edge 33 to a 90-degree point, then cylindrical from this point to leading edge 40. (The 90-degree point as used herein is defined as the equator in the plane normal to the flange body's axis. The 90-degree point is shown as point "A" in FIG. 4.) Retainer ring 36 in this embodiment extends only part of the way from leading edge 40 to the 90-degree point, leaving a gap (designated "B" in FIG. 4) between the spherical portions of the resulting surface. For the purposes of this disclosure, such a surface is considered an equatorial band even though the equator and immediately adjacent portion of the spherical surface may not be included.

Figure 5:
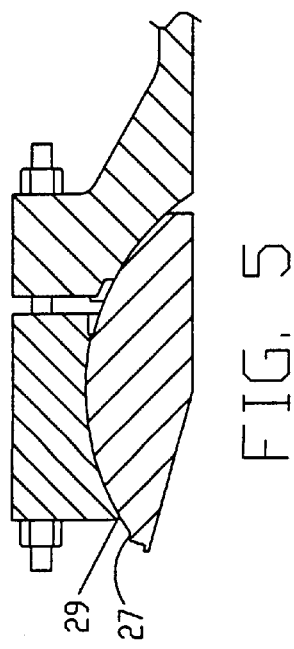
FIG. 5 is a particle axial section of one embodiment of the swivel coupling showing the detail of the ball and flange stops.

Referring to FIG. 5, ball stop 27 and flange stop 28 can be seen in greater detail. Ball stop 27 is located near the trailing edge 18 of ball member 13, adjacent to outer surface 14. Flange stop 28 is located at the trailing edge 33 of swivel flange 30 adjacent to inner surface 31. Ball stop 27 and flange stop 28 comprise "flattened" portions of the surfaces of ball member 14 and swivel flange 30 which allow the pressure of the contact between the two surfaces to be distributed over the stop surfaces. (In actuality, the stop surfaces are not flat, but are conic or cylindrical surfaces.) When the swivel coupling is at its maximum misalignment, ball stop 27 contacts flange stop 28 and prevents further misalignment.

Figure 6:
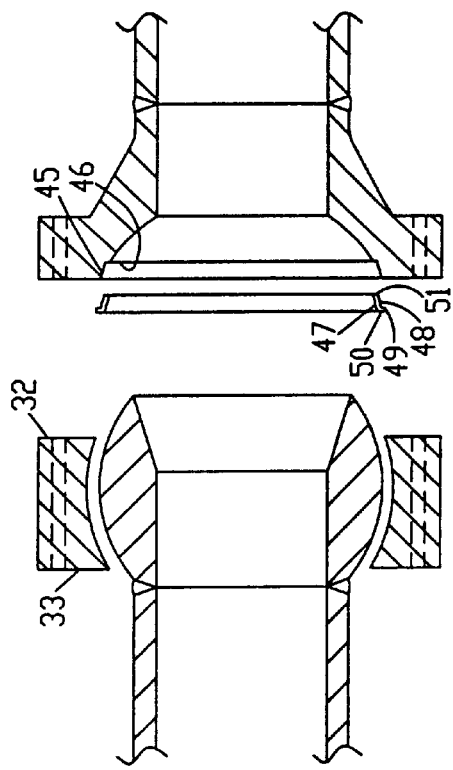
FIG. 6 is an exploded axial section of one embodiment of the installed swivel coupling.
Figure 7:
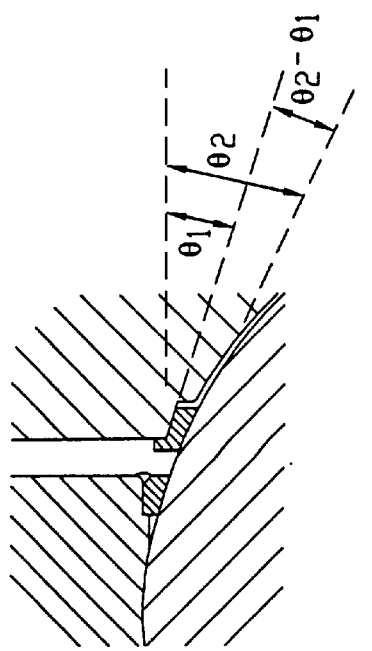
FIG. 7 is a partial axial section of one embodiment of the swivel coupling showing the detail of the retainer ring and tapered sealing ring.

As described above, socket member 20 has a tapered groove recessed into the spherical portion 23 of its inner surface 21. This is shown in more detail in FIGS. 6 and 7. The recess is formed by a tapered surface 45 and a shoulder 46. Tapered surface 45 forms an angle of $\Phi_1$ with the axis of socket member 20 so that the diameter of tapered surface 45 increases as the surface approaches leading edge 25. When ball member 13 and socket member 20 are in mating contact, outer surface 14 of ball member 13 provides an opposing surface to tapered surface 45 so that a wedge-shaped cavity is formed. At the position of the cavity, the angle of surface 14 of ball member 13 with respect to the axis of socket member 20 can be approximated as the tangent to surface 14 at that point. The tangent has an angle of $\Phi_2$. The wedge-shaped cavity formed between ball member 13 and socket member 20 therefore has an angle of $\Phi_2-\Phi_1$. FIG. 7 shows that there is a slight gap between ball member 13 and socket member 20 from the leading edge 19 of the ball member to the wedge-shaped cavity. When a seal is located in the cavity, the fluid pressure in the pipeline is communicated through the gap to one side of the seal. Assuming that the pressure in the pipeline is greater than the pressure outside the pipeline, the seal will be pushed to the narrow side of the wedge-shaped cavity, thereby compressing the seal against ball member 13 and socket member 20. The seal is thus held more tightly against the ball and socket members as the internal pipeline pressure is increased.

Although the recess in the socket member may accept various types of seals (e.g., standard o-rings,) the illustrated embodiment uses a tapered sealing ring 29. Sealing ring 29 has tapered inner 47 and outer 48 surfaces, a lip 49 and a leading edge 50. Outer surface 48 forms an angle of $\Phi_1$ with the axis of socket member 20, matching the angle of tapered surface 45. Thus, when sealing ring 29 is placed in the recess, surfaces 45 and 48 are flush with each other. Inner surface 47 forms an angle $\Phi_2$ with the axis of socket member 20 to match the angle of the tangent to ball member 13 at the location of the recess. Surface 47 may, if necessary, be made spherical to match outer surface 14 of ball member 13. As described above, $\Phi_2$ is greater than $\Phi_1$ so that the thickness of sealing ring 29 decreases as it approaches leading edge 50. The resulting wedge shape of retainer ring 29 corresponds to the wedge shape of the recess, allowing retainer ring to be wedged into the recess by fluid pressure within the pipeline. At leading edge 50, lip 49 extends radially outward from retainer ring 29. When retainer ring 29 is positioned in the recess in socket member 20, lip 49 abuts leading edge 25 of socket member 20. Lip 49 thereby maintains retainer ring 29 in alignment with socket member 20. Lip 49 also prevents the retainer ring from sliding away from the leading edge 25 of socket member 20 and thereby reducing the integrity of the seal between ball member 13 and socket member 20.

What is claimed is:

1. A swivel coupling for connecting adjoining pipe sections in a pipeline comprising:

a unitary annular swivel flange having an inner surface, said inner surface including an equatorial band and forming a cavity in said swivel flange, said annular swivel flange having a substantially uniform thickness from a front face to a rear face, said swivel flange having a first plurality of bolt holes therethrough from said front face to said rear face, wherein said swivel flange includes an annular flange body and a retainer, ring wherein said flange body has an inner surface comprising a first portion of said swivel flange inner surface, said flange body inner surface having a first recess therein, and wherein said retainer ring has an inner surface comprising a second portion of said swivel flange inner surface, said retainer ring being disposed in said first recess and welded to said flange body to form a single-piece swivel flange;

a ball member having an aperture therethrough and a spherical outer surface, said ball member further having a trailing edge configured to be attached to a pipe section said ball member being disposed within said cavity in said swivel flange and being captive therein;

a socket member having an aperture therethrough and a spherical inner surface, said socket member further having a trailing edge configured to be attached to a pipe section, said socket member being disposed with said inner surface of said socket member in mating relation with said outer surface of said ball member, said socket member having an integral flange, said integral flange having a second plurality of bolt holes therethrough corresponding to said first plurality of bolt holes, said integral flange being connected to said swivel flange by a plurality of bolts extending through said first and second pluralities of bolt holes to hold said inner surface of said socket member and said outer surface of said ball member in mating relation; and a sealing ring and wherein said socket member inner surface has a second recess therein for receiving said sealing ring, said second recess being disposed adjacent to a leading edge of said socket member, said sealing ring being seated in said second recess and forming a seal between said socket member and said ball member.

2. The swivel coupling of claim 1 wherein said second recess is defined by an opposing wall and wherein when said socket member and said ball member are in mating relation said outer surface of said ball member and said opposing wall form a tapered cavity having a narrow end adjacent said leading edge of said socket member.

3. The swivel coupling of claim 2 wherein said ball member and said socket member have a gap therebetween, said gap extending from said aperture of said socket member to said second recess, said recess being in fluid communication with said aperture of said socket member.

4. The swivel coupling of claim 2 wherein said sealing ring has an inner tapered surface and an outer tapered surface, said sealing ring having a thickness which decreases as said sealing ring approaches said leading edge of said socket member, said sealing ring further having a radially outwardly extending lip at a leading edge of said sealing ring, said lip abutting said leading edge of said socket member.

* * * * *